United States Patent [19]
Fischer

[11] Patent Number: 5,653,461
[45] Date of Patent: Aug. 5, 1997

[54] COVER FOR A GAS BAG OF AN OCCUPANT RESTRAINING SYSTEM IN VEHICLES

[75] Inventor: Anton Fischer, Heuchlingen, Germany

[73] Assignee: TRW Occupant Restraint Systems GmbH, Alfdorf, Germany

[21] Appl. No.: 644,306

[22] Filed: May 10, 1996

[30] Foreign Application Priority Data

May 16, 1995 [DE] Germany ............... 295 08 063.9

[51] Int. Cl.⁶ .................................. B60R 21/16
[52] U.S. Cl. ........................ 280/728.3; 280/728.2
[58] Field of Search ................ 280/728.3, 728.2, 280/732, 728.1

[56] References Cited

U.S. PATENT DOCUMENTS

| | | | |
|---|---|---|---|
| 4,925,209 | 5/1990 | Sakarai | 280/728.3 |
| 5,031,930 | 7/1991 | Sato | 280/732 |
| 5,306,042 | 4/1994 | Frank | 280/728.3 |
| 5,378,013 | 1/1995 | Warner | 280/728.3 |
| 5,385,366 | 1/1995 | Frank et al. | 280/728.3 |
| 5,398,959 | 3/1995 | Avila | 280/728.3 |

FOREIGN PATENT DOCUMENTS

| | | | |
|---|---|---|---|
| 2649945 | 1/1991 | France . | |
| 4128945 | 4/1992 | Germany | 280/728.3 |
| 4309925 | 10/1993 | Germany | 280/728.3 |
| 4233749 | 4/1994 | Germany . | |
| 0086653 | 4/1991 | Japan | 280/728.3 |

*Primary Examiner*—Christopher P. Ellis
*Attorney, Agent, or Firm*—Tarolli, Sundheim, Covell, Tummino & Szabo

[57] ABSTRACT

The invention relates to a cover for a gas bag of an occupant restraining system in vehicles and more especially to the attachment of such a cover on the instrument panel on the front passenger seat side of a motor vehicle. The cover is characterized in that on the side, which faces the instrument panel (12), of the covering plate (10) at least one tape-like lug (14) is formed, which is trained under a holding yoke (16) secured in the interior of the instrument panel and at its end (18) opposite to the covering plate is so widened that this end is unable to slip past the holding yoke.

8 Claims, 1 Drawing Sheet

COVER FOR A GAS BAG OF AN OCCUPANT RESTRAINING SYSTEM IN VEHICLES

FIELD OF THE INVENTION

The invention relates to a cover for a gas bag of an occupant restraining system in vehicles and more especially to the attachment of such a cover on the instrument panel on the front passenger seat side of a motor vehicle.

BACKGROUND OF THE INVENTION

Covers for the gas bags of occupant restraining systems are normally connected with the instrument panel of a motor vehicle in a freely movable fashion by means of one textile tape or, respectively, several textile tapes. The cover is hence able to be adjusted three-dimensionally and its final position is only determined by the geometry of the opening area in the instrument panel. The tapes, which are secured by foam or by molding in or on the cover or are sewn adjacent to the cover are only responsible for the anchoring of the cover after the opening of the cover as caused by the deployment of the gas bag. The tapes then absorb the kinetic energy of the blasted open cover.

The production of covers with separate tapes is costly. Furthermore, the connection of the textile tapes with the plastic material of the cover is not free of safety hazards.

SUMMARY OF THE INVENTION

One object of the invention is to overcome these disadvantages.

Therefore, in accordance with the invention, a cover for a gas bag of an occupant restraining system in vehicles is provided which possesses a covering plate installed in the instrument panel, characterized in that on the side, facing the instrument panel, of the covering plate at least one tape-like lug is molded, which is extended under a holding yoke attached in the interior of the instrument panel and at its end opposite to the covering plate is so widened that this end is prevented from slipping past the holding yoke.

It is an advantage if several knob- or rib-like holding elements are formed on the tape-like lug extending in the transverse direction, which engage the holding yoke. It is in this manner that frictional forces are increased which would have to be overcome by the tape in order to slip under the yoke and which means that on blasting open the cover additional kinetic energy is dissipated.

BRIEF DESCRIPTION OF THE DRAWINGS

The invention will now be described in detail with reference to the drawing.

DESCRIPTION OF THE INVENTION

Figure 1:
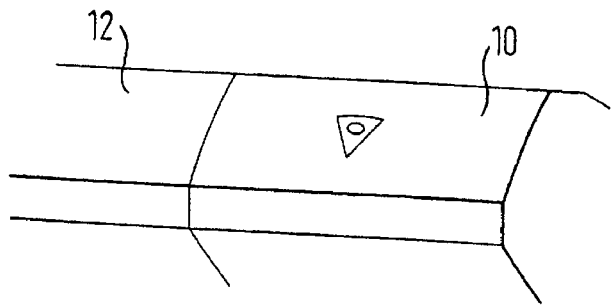
FIG. 1 shows a diagrammatic representation of a cover on the front passenger seat side.

FIG. 1 shows by way of example a cover for a gas bag of an occupant restraining system on the co-driver or front passenger seat side of a motor vehicle with a cover fitted in the instrument panel 12. During deployment of the gas bag arranged in the interior of instrument panel the covering plate 10 of the cover is blasted off.

Figure 2:
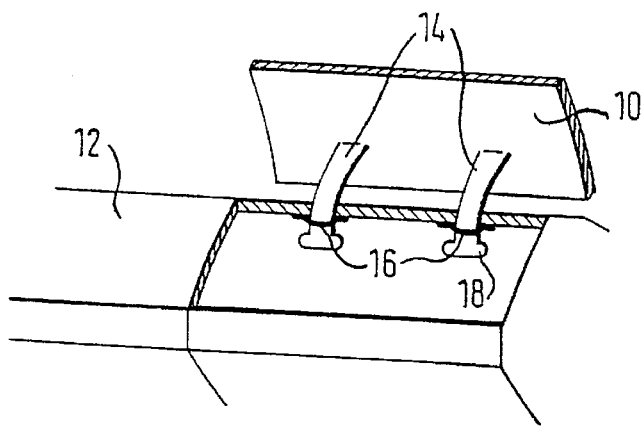
FIG. 2 is a diagrammatic elevation of a cover after opening.

FIG. 2 diagrammatically shows the cover for a gas bag of an occupant restraining system in the opened state. On the side, which in the installed state faces the interior of the instrument panel, of the covering plate 10 at least one tape-like lug 14 is molded on, for example by injection molding, i.e. the covering plate 10 or, respectively, an inlay part arranged on the back side thereof, and the lug 14 consist of the same material and are integrally formed, for example by injection molding. The lug 14 is trained under a holding yoke 16 secured to the instrument panel in the interior thereof and at its free end remote from the covering plate 10 is made wider. This end constitutes a stop 18, which is unable to move past the holding yoke 16. The number of tape-like lugs 14 and the form of the stop 18 may be freely selected.

Figure 3:
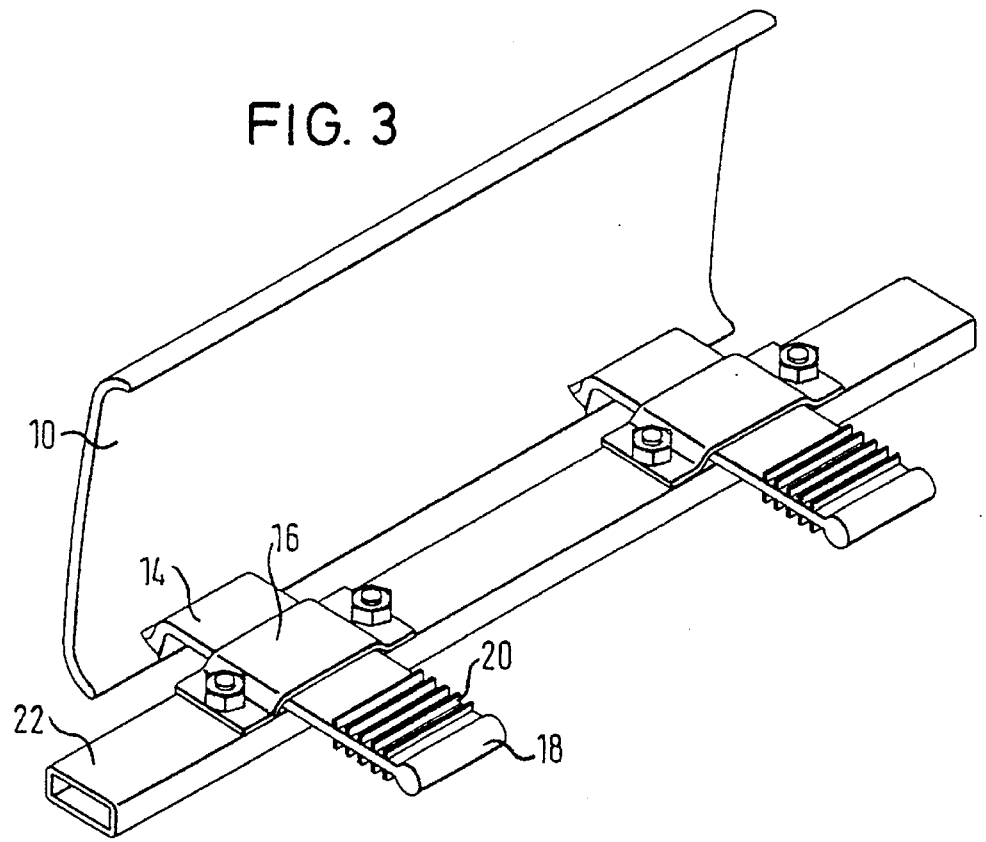
FIG. 3 diagrammatically illustrates the attachment of the cover.

As shown in FIG. 3 the tape-like lug 14 molded on the covering plate 10 is preferably provided with holding elements 20 extending on and athwart the tape. These holding elements 20 are preferably in the form of ribs and/or knobs (not illustrated in the present case). The ribs or knobs abut the holding yoke 16 and owing to increased frictional forces mean that more energy is required before the tape 14 can slip through under the holding yoke 16. The holding yoke 16 is in the illustrated working embodiment attached by screw means to a bar 22 secured in the interior of the instrument panel. The stop 18 preferably possesses a substantially circular cross section. Its diameter is greater than the clearance width between the top edge of the bar 22 and the surface, facing the same, of the holding yoke 16 with the result that the stop 18 may not slip through underneath the holding yoke 16.

The cover in accordance with the invention may be manufactured at low cost and offers a high degree of functional reliability, since for the production of the covering plate 10 or, respectively, a corresponding inlay part and the lugs 14 the same plastic material is employed and the risk of fracture is reduced.

What is claimed is:

1. A cover for a gas bag of an occupant restraining system in vehicles, said cover comprising a covering plate installed in an instrument panel of the vehicle, said covering plate having a back side which in the installed state faces the interior of said instrument panel, a holding yoke secured in the interior of said instrument panel, and at least one tape-like lug on said back side of said covering plate and having a free end remote from said covering plate, wherein said lug is trained under said holding yoke and is freely movable under said holding yoke under the influence of the gas bag during deployment of the gas bag, and wherein said free end of said lug is so widened that said free end is prevented from slipping past said holding yoke during deployment of the gas bag.

2. The cover as claimed in claim 1, wherein said tape-like lug comprises several holding elements extending athwart and on the tape-like lug, said elements being adapted to abut the holding yoke.

3. The cover as claimed in claim 2, wherein said holding elements are in the form of ribs or knobs.

4. The cover as claimed in claim 1, wherein said tape-like lug is freely movable under said holding yoke fully between said holding yoke and said free end under the influence of the gas bag during deployment of the gas bag.

5. The cover as claimed in claim 4, wherein said tape-like lug projects longitudinally from said back side of said covering plate at a location that is spaced from the periphery of said covering plate.

6. The cover as claimed in claim 5 wherein said tape-like lug is one of a plurality of lugs which are alike.

7. A cover for a gas bag of an occupant restraining system in vehicles, the cover comprising a covering plate installed in an instrument panel of the vehicle, the covering plate having a back side which in the installed state faces the interior of said instrument panel, a holding yoke secured in the interior of said instrument panel, and at least one tape-like lug molded on the back side of said covering plate and having a free end remote from said covering plate, wherein said lug is trained under said holding yoke, and wherein said free end of said lug is so widened that said free end is prevented from slipping past said holding yoke during deployment of the gas bag;

said tape-like lug comprising several holding elements extending athwart and on said tape-like lug, said elements being adapted to abut said holding yoke.

8. The cover as claimed in claim 7, wherein said holding elements are in the form of ribs or knots.

* * * * *